(12) United States Patent
Ono et al.

(10) Patent No.: US 8,111,530 B2
(45) Date of Patent: Feb. 7, 2012

(54) 3-LEVEL POWER CONVERTER

(75) Inventors: Yoshitaka Ono, Tokyo (JP); Takeshi Tanaka, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 385 days.

(21) Appl. No.: 12/517,940

(22) PCT Filed: Dec. 20, 2006

(86) PCT No.: PCT/JP2006/325359
§ 371 (c)(1),
(2), (4) Date: Jun. 5, 2009

(87) PCT Pub. No.: WO2008/075418
PCT Pub. Date: Jun. 26, 2008

(65) Prior Publication Data
US 2010/0315776 A1    Dec. 16, 2010

(51) Int. Cl.
*H02H 7/122* (2006.01)
(52) U.S. Cl. .................................... 363/56.01
(58) Field of Classification Search .............. 363/43, 363/56, 58, 98, 132, 136, 137, 56.01, 59, 363/144, 147
See application file for complete search history.

(56) References Cited

U.S. PATENT DOCUMENTS

| | | | |
|---|---|---|---|
| 5,459,655 A | 10/1995 | Mori et al. | |
| 5,953,222 A * | 9/1999 | Mizutani | 363/56.05 |
| 6,084,788 A * | 7/2000 | Mizutani | 363/56.12 |

FOREIGN PATENT DOCUMENTS

| | | | |
|---|---|---|---|
| JP | 5-83947 A | | 4/1993 |
| JP | 6-165524 A | | 6/1994 |
| JP | 7-213076 A | | 8/1995 |
| JP | 09233850 A | * | 9/1997 |
| JP | 10-14260 A | | 1/1998 |
| JP | 11-332253 A | | 11/1999 |
| JP | 3229931 B2 | | 11/2001 |
| JP | 2002-153078 A | | 5/2002 |

OTHER PUBLICATIONS

International Search Report (PCT/ISA/210) for PCT/JP2006/325359 completed Mar. 12, 2007.

* cited by examiner

*Primary Examiner* — Adolf Berhane
(74) *Attorney, Agent, or Firm* — Buchanan Ingersoll & Rooney PC

(57) ABSTRACT

A 3-level power converter is provided, which is reduced in size of the converter, reduced in floating inductance of each of wirings interconnecting between respective elements, and easily attached with a snubber circuit. The 3-level power converter performs on/off control of first to fourth switching elements 1 to 4 so as to output a 3-level voltage from an AC output terminal AC, wherein the power converter has a first module 11 including the first and fourth switching elements 1 and 4 as a configuration unit, a second module 12 including the second and third switching elements 2 and 3 as a configuration unit, a third module 14 including a first coupling diode 5 as a configuration unit, and a fourth module 13 including a second coupling diode as a configuration unit, and the second module 11, the fourth module 14, the third module 13, and the first module 11 are sequentially arranged in a line from a position near the AC output terminal AC.

7 Claims, 6 Drawing Sheets

3-LEVEL POWER CONVERTER

TECHNICAL FIELD

The present invention relates to a 3-level power converter that outputs a 3-level voltage by using a switching element such as IGBT.

BACKGROUND ART

As shown in patent document 1, a prior 3-level power converter includes a DC voltage source having a positive terminal, an intermediate terminal, and a negative terminal, first and second IGBT sequentially connected in series between the positive terminal and an AC output terminal, a first coupling diode connected between a connection point between the first and second IGBT and the intermediate terminal, third and fourth IGBT sequentially connected in series between the AC output terminal and the negative terminal, and a second coupling diode connected between a connection point between the third and fourth IGBT and the intermediate terminal, and the power converter is configured to appropriately perform on/off control of the first to fourth IGBT so as to output a 3-level voltage from the AC output terminal.

Patent document 1: Japanese Patent No. 3,229,931

DISCLOSURE OF THE INVENTION

Problems that the Invention is to Solve

In a prior 3-level power converter, since four modules each mounted with one IGBT are used, the converter has a large size, which causes large floating inductance of each of wirings interconnecting between respective elements, leading to a high turn-off surge voltage.

A method of controlling the turn-off surge voltage includes a method where a snubber circuit using a capacitor is separately connected in parallel to each IGBT for absorbing energy of floating inductance of a wiring. However, when wiring inductance is increased, capacitance of the capacitor of the snubber circuit, which absorbs energy of the wiring inductance, is also increased, in addition, although amount of heat generated by an element does not vary depending on an element layout, a cooler sometimes becomes large, leading to reduction in reliability due to increase in loss in the converter, increase in size of a converter shape, increase in converter cost, and increase in number of components.

The invention was made to solve the above problem, and provides a 3-level power converter, which is reduced in size of the converter, reduced in floating inductance of each of wirings interconnecting between respective elements, and easily attached with a snubber circuit.

Means for Solving the Problems

The invention includes a 3-level power converter, which includes a DC voltage source having a positive terminal, an intermediate terminal, and a negative terminal, first and second switching elements sequentially connected in series between the positive terminal and an AC output terminal, a first coupling diode connected between a connection point between the first and second switching elements and the intermediate terminal, third and fourth switching elements sequentially connected in series between the AC output terminal and the negative terminal, and a second coupling diode connected between a connection point between the third and fourth switching elements and the intermediate terminal, and performs on/off control of the first to fourth switching elements so as to output a 3-level voltage from the AC output terminal; wherein the power converter has a first module including a set of the first and fourth switching elements as a configuration unit, a second module including a set of the second and third switching elements as a configuration unit, a third module including the first coupling diode, and a fourth module including the second coupling diode, and the second module, the fourth module, the third module, and the first module are sequentially arranged in a line from a position near the AC output terminal.

Advantage of the Invention

According to the invention, a 3-level power converter may be achieved, which is reduced in size of the converter, reduced in floating inductance of each of wirings interconnecting between respective elements, and easily attached with a snubber circuit depending on capacitance of the converter.

BEST MODE FOR CARRYING OUT THE INVENTION

Embodiment 1

Figure 1:
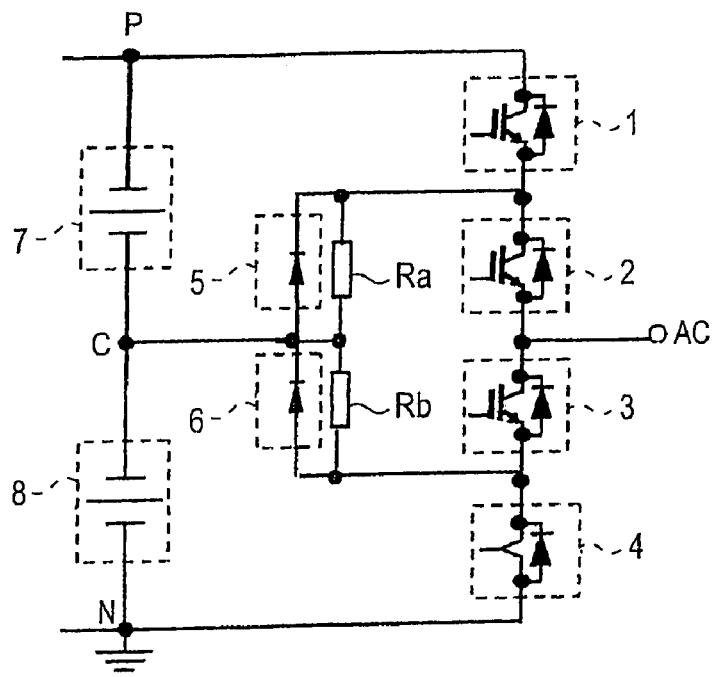
FIG. 1 It is a circuit diagram showing a main circuit configuration of a 3-level power converter showing embodiment 1 of the invention.

FIG. 1 shows a circuit block diagram showing a 3-level power converter of embodiment 1 of the invention. In the figure, a DC voltage source includes capacitors 7 and 8 connected in series, and has a positive terminal P, an intermediate terminal C, and a negative terminal N.

A positive arm portion between the positive terminal P of the DC voltage source and an AC output terminal AC is configured by first and second IGBT 1 and 2, and a first coupling diode 5, wherein a collector of the first IGBT 1 is connected to the positive terminal P, and an emitter thereof is connected to a collector of the second IGBT 2 and a cathode of the first coupling diode 5. An anode of the first coupling diode 5 is connected to the intermediate terminal C, and an emitter of the second IGBT 2 is connected to the AC output terminal AC.

Next, a negative arm portion between the AC output terminal AC and the negative terminal N is configured by third and fourth IGBT 3 and 4, and a second coupling diode 6, wherein a collector of the third IGBT 3 is connected to the AC output terminal AC, and an emitter thereof is connected to a collector C of the fourth IGBT 4 and a anode of the second coupling diode 6. A cathode of the second coupling diode 6 is connected to the intermediate terminal C, and an emitter of the fourth IGBT 4 is connected to the negative terminal N.

Voltage dividing resistances Ra and Rb are connected in parallel to the first and second coupling diodes 5 and 6 respectively.

In the 3-level power converter configured as above, the first to fourth IGBT 1 to 4 are appropriately subjected to on/off control by a known method so as to output a 3-level voltage from the AC output terminal AC, and when the respective IGBT 1 to 4 are turned off, a high turn-off surge voltage is generated due to floating inductance of each of wirings interconnecting between the respective elements.

Figure 2:
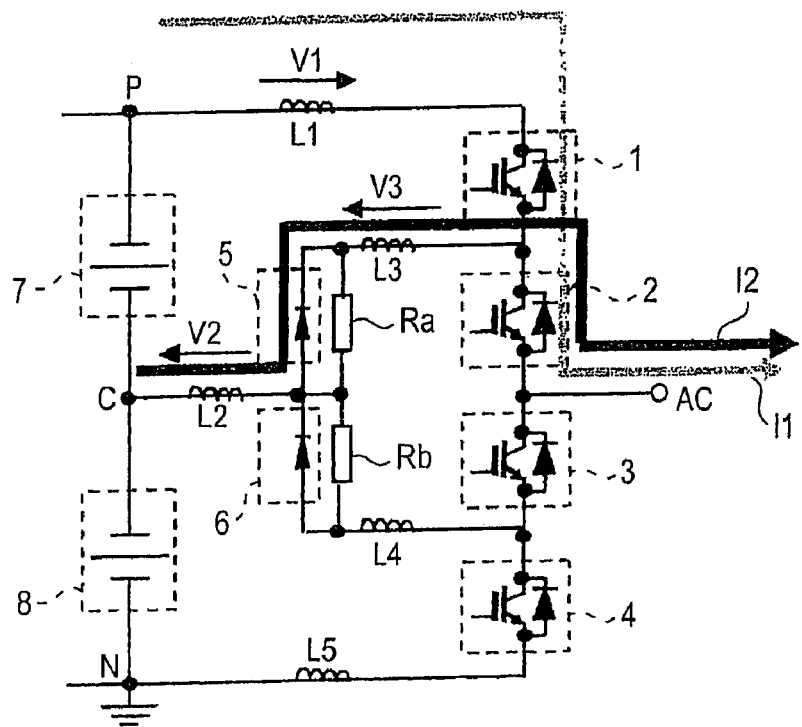
FIG. 2 It is an explanatory diagram showing an example of an operation state of the main circuit of FIG. 1.
Figure 3:
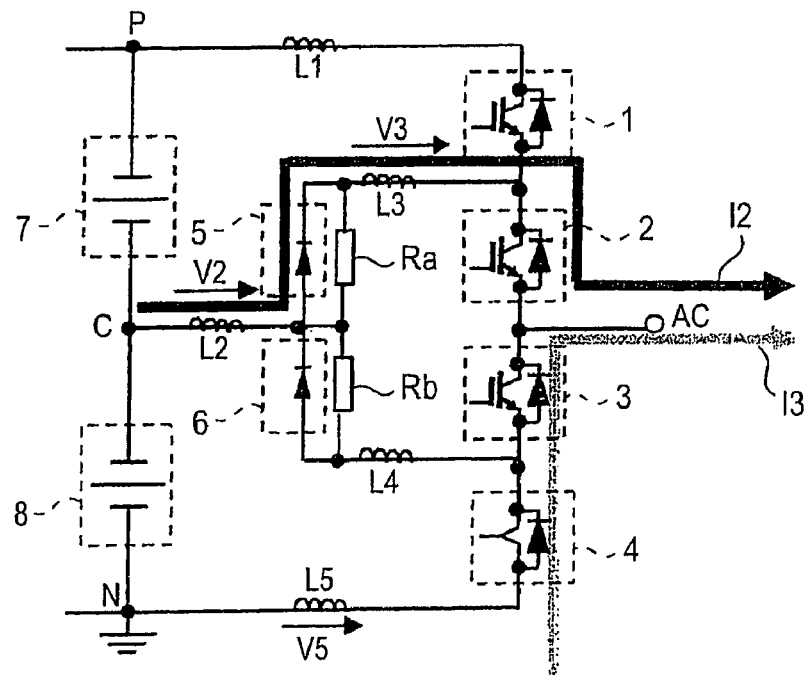
FIG. 3 It is an explanatory diagram showing another example of the operation state of the main circuit of FIG. 1.

FIGS. 2 and 3 show explanatory diagrams showing an example of a current path in an operation state of the 3-level power converter respectively, wherein L1 to L5 show floating inductance of wirings interconnecting between the respective elements. When the IGBT 1 is turned off from a state where both the IGBT 1 and 2 are on as shown in FIG. 2, a current I1 is commutated to a current I2. In this case, the IGBT 1 is applied with a total voltage of a voltage of the capacitor 7, and voltages V1, V2 and V3 as a surge voltage due to a voltage induced by inductance of each wiring.

When the IGBT 2 is turned off, and respective flywheel diodes of the IGBT 3 and 4 are turned on as shown in FIG. 2, that is, when a current I2 is commutated to a current I3, the IGBT 2 is applied with a total voltage of a voltage of the capacitor 8, and voltages V2, V3 and V5 as a surge voltage.

Each of the surge voltages is called turn-off surge voltage, and if the turn-off surge voltage is not suppressed within a safety operation range, the IGBT is broken.

In the case of the prior 3-level power converter, since four modules each mounted with one IGBT are connected in series, size becomes large, which increases floating inductance of each wiring, leading to increase in turn-off surge voltage. Therefore, a snubber circuit is typically attached to each IGBT in order to protect the IGBT from the turn-off surge voltage, which further causes increase in size of the converter.

Figure 4:
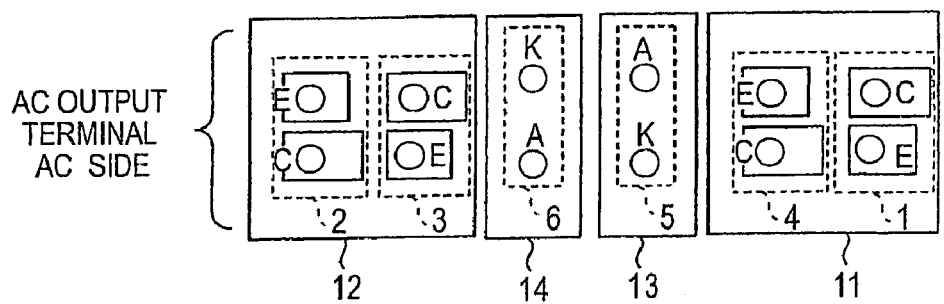
FIG. 4 It is a plan view showing a module arrangement configuration of the 3-level power converter of the embodiment 1.
Figure 5:
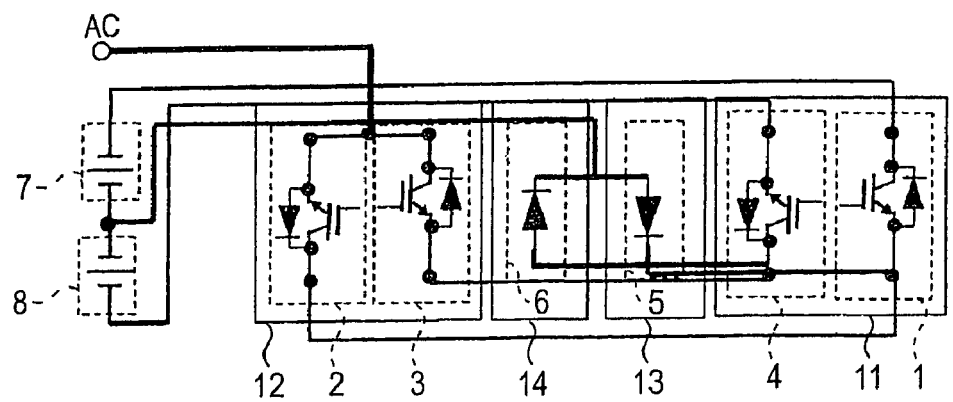
FIG. 5 It is an explanatory diagram showing interconnection between respective elements in the module arrangement configuration of FIG. 4.

Thus, in the 3-level power converter according to the embodiment 1 of the invention, a module including two IGBT elements is used as shown in FIG. 4, and a first module 11 is configured by a set of the first and fourth IGBT 1 and 4 being outer elements as a configuration unit, and a second module 12 is configured by a set of the second and third IGBT 2 and 3 being inner elements as a configuration unit, and the modules 11 and 12 are disposed on both sides, and a third module 13 including the first coupling diode and a fourth module 14 including the second coupling diode are disposed between the modules, and the modules are in a module arrangement configuration where the second module 12, the fourth module 14, the third module 13, and the first module 11 are sequentially arranged in a line from a position near the AC output terminal AC, and the elements of the respective modules are connected to the respective capacitors 7 and 8 being a DC voltage source as shown in FIG. 5. In FIG. 4, C and E show a cathode and an anode of each IGBT, and A and K show a cathode and an anode of each coupling diode.

According to such a module arrangement configuration, compared with a configuration where four modules each mounted with one IGBT and two diode modules are arranged in a line, and elements of the respective modules are connected to one another as in the past, a converter can be reduced in size, and consequently floating inductance of each wiring can be reduced.

Figure 6:
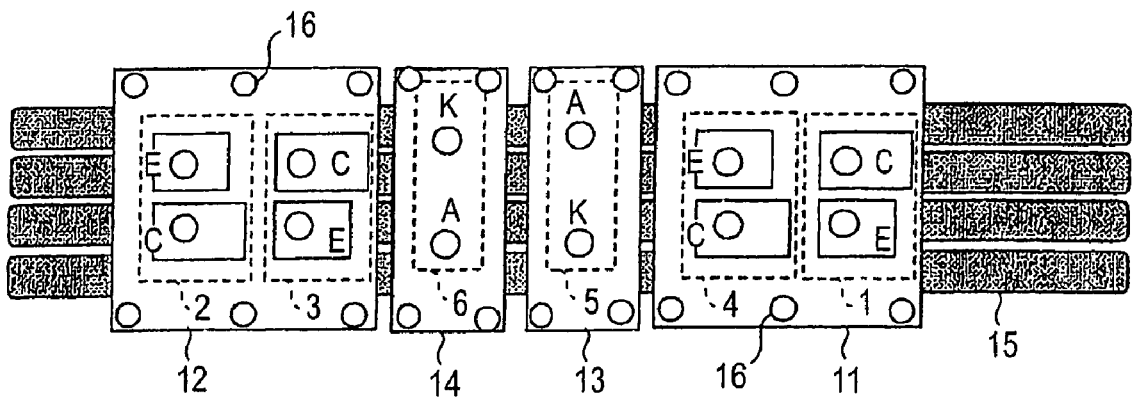
FIG. 6 It is a plan view showing a case that heat pipes are provided through cooler bases of the modules in the embodiment 1.

When a heat pipe is used as cooling means of each module, screw clamp portions 16 of the modules 11 to 14 are arranged in parallel along each of sides in a direction of inserting each heat pipe 15 as shown in FIG. 6, thereby the heat pipe 15 can be inserted into a cooler of each module without being blocked by the respective screw clamp portions 16 of the modules, leading to reduction in size of a cooling structure.

Embodiment 2

Embodiment 2 shows an example of a case that a snubber circuit is provided in the 3-level power converter of the embodiment 1.

Figure 7:
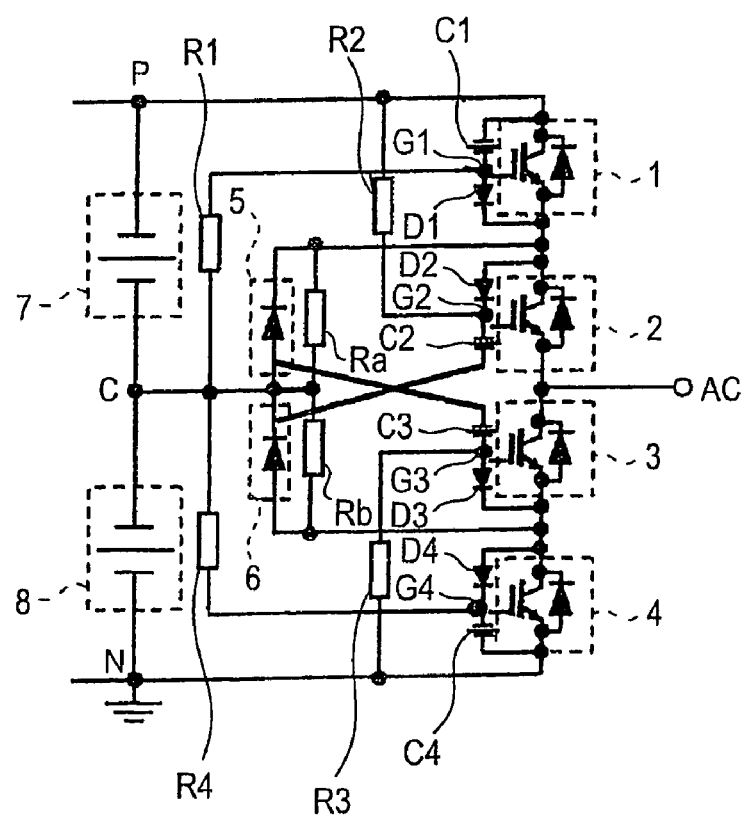
FIG. 7 It is a circuit diagram showing a case that snubber circuits are provided as embodiment 2 of the invention.

FIG. 7 shows a circuit configuration in the case that each of the first to fourth IGBT is added with a snubber circuit connected in parallel to the IGBT.

In FIG. 7, a snubber circuit for the second IGBT 2 is formed by a diode D2 having an anode connected to a collector side of the second IGBT 2, a capacitor C2 connected between a cathode side of the diode and a cathode side of the second coupling diode 6, and a discharge resistance R2 connected between a connection point between the capacitor and a cathode of the diode 6, and a positive terminal P.

A snubber circuit for the third IGBT 3 is formed by a diode D3 having a cathode connected to an emitter side of the third IGBT 3, a capacitor C3 connected between an anode side of the diode and an anode side of the first coupling diode a, and a discharge resistance R3 connected between a connection point between the capacitor and a cathode of the diode D3, and a negative terminal N.

Furthermore, a snubber circuit for the first IGBT 1 is formed by a capacitor C1 having one end connected to a collector side of the first IGBT 1, a diode D1 having a cathode connected to an emitter side of the first IGBT 1 and an anode connected to the other end of the capacitor C1, and a discharge resistance R1 connected between a connection point between the capacitor C1 and the diode D1, and the intermediate terminal C of the DC power supply.

A snubber circuit for the fourth IGBT 1 is formed by a capacitor C4 having one end connected to an emitter side of the fourth IGBT 4, a diode D4 having an anode connected to a collector side of the fourth IGBT 4 and a cathode connected to the other end of the capacitor C4, and a discharge resistance R4 connected between a connection point between the capacitor C4 and the diode D4, and the intermediate terminal C of the DC power supply.

In the embodiment 2, the respective first to fourth snubber circuits are configured as snubber units as shown in FIG. 8 in order to facilitate attaching the snubber circuits in correspondence to the module arrangement configuration as shown in the embodiment 1.

Figures 8A, 8B, 8C:
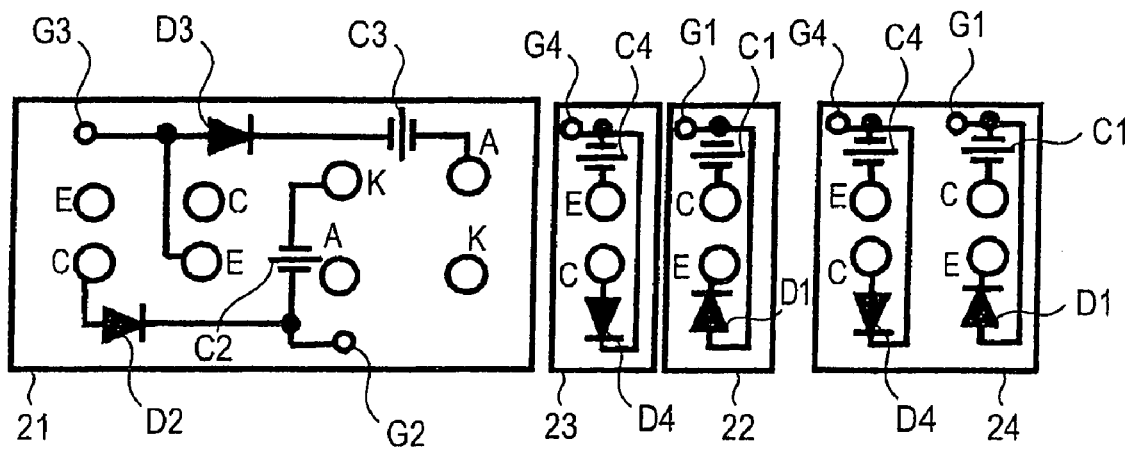
FIG. 8 It is a configuration view showing an example of snubber units used in the embodiment 2.

FIG. 8(a) shows an example of configuring a first snubber unit 21 by forming circuit portions, excepting the discharge resistances R2 and R3 in the snubber circuits for the second and third IGBT 2 and 3, on a common substrate, FIG. 8(b) shows an example of configuring second and third snubber units 22 and 23 by forming circuit portions, excepting the discharge resistances R1 and R4 in the snubber circuits for the first and fourth IGBT 1 and 4, on different substrates respectively, and FIG. 8(c) shows an example of configuring a fourth snubber unit 24 by forming circuit portions, excepting the discharge resistances R1 and R4 in the snubber circuits for the first and fourth IGBT 1 and 4, on a common substrate.

In the figure, C and E show connection terminal portions corresponding to a cathode and an anode of each IGBT, A and K show connection terminal portions corresponding to a cathode and an anode of each coupling diode, and G1, G2, G3 and G4 show respective connection terminal portions to the discharge resistances R1 and R4, respectively.

If necessary, the first to fourth snubber units 21 to 24 shown in FIG. 8 are disposed in a manner of superposing on the modules arranged in a line in the module arrangement configuration shown in FIG. 5, and connected to the respective elements of the modules by using a plurality of plate-like wiring boards disposed adjacently to one another via an insulating plate.

Figure 9:
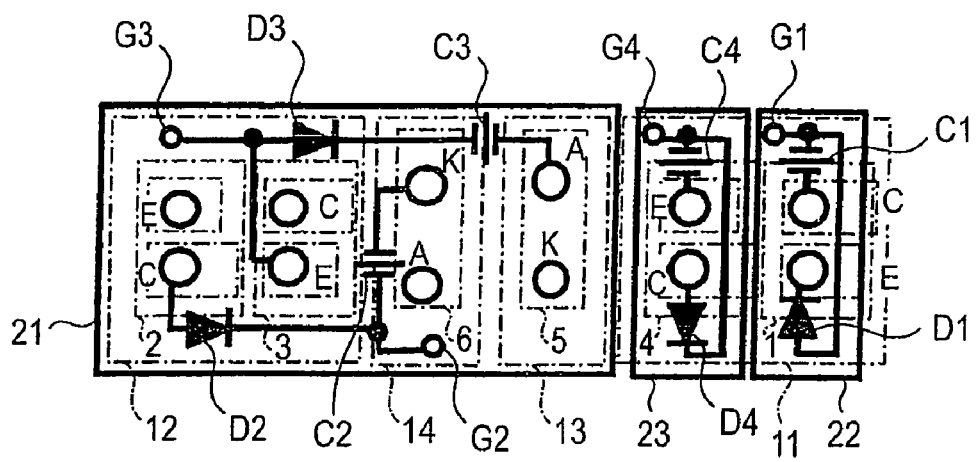
FIG. 9 It is a configuration view showing an example in the case that the snubber units are provided in the embodiment 2.
Figure 10:
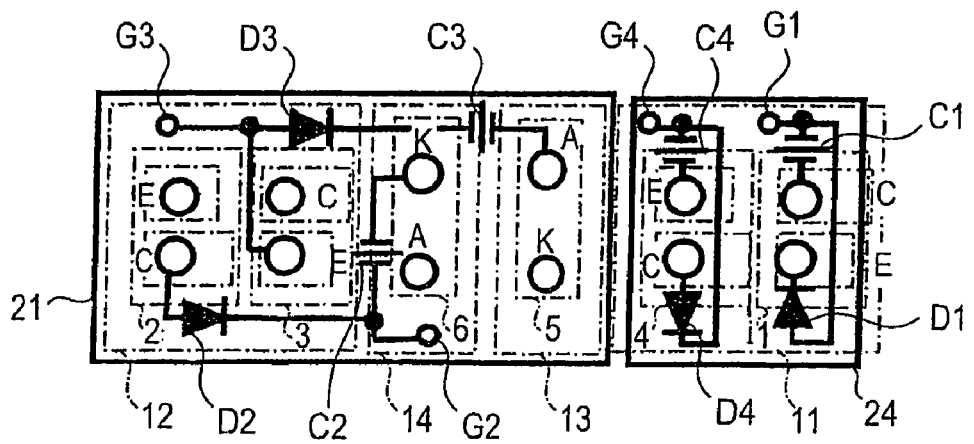
FIG. 10 It is a configuration view showing another example in the case that the snubber units are provided in the embodiment 2.

FIG. 9 shows an example of sequentially arranging the first snubber unit 21, the third snubber unit 23 and the second snubber unit 22 in a line, and FIG. 10 shows an example of adjacently arranging the first snubber unit 21 and the fourth snubber unit 24.

Figure 11:
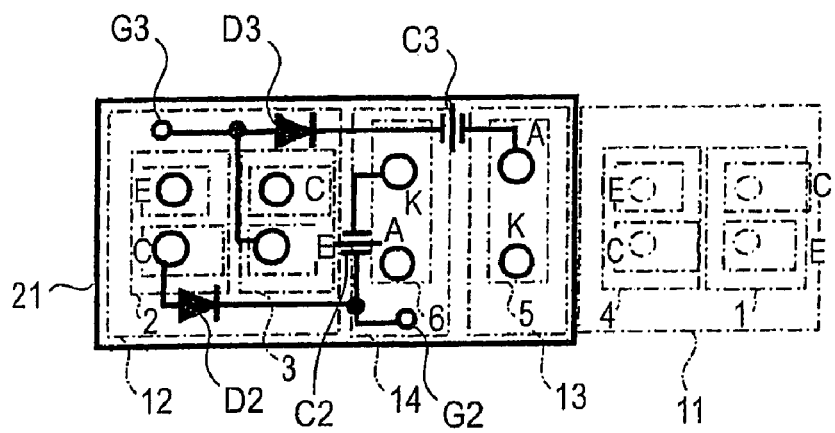
FIG. 11 It is a configuration view showing still another example in the case that the snubber units are provided in the embodiment 2.

The snubber circuits for the first and fourth IGBT being outer elements are sometimes not required depending on internal inductance of a main circuit. In such a case, only the first snubber unit 21 can be provided as shown in FIG. 11.

In this way, the snubber units are divided into the units for the inner elements and the units for the outer elements. Thus, the snubber units may be appropriately used depending on size of inductance of the main circuit.

Figure 12A:
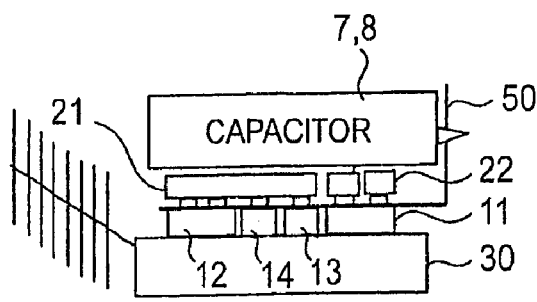
FIG. 12 It is a side view schematically showing an example of a converter as a whole in the case that the snubber units are provided in the embodiment 2.
Figure 12B:
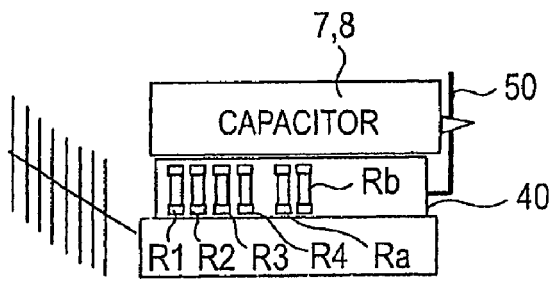
Figure 13A:
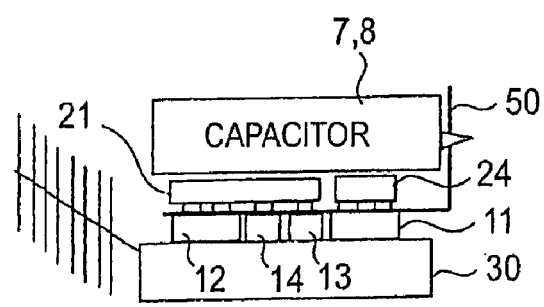
FIG. 13 It is a side view schematically showing another example of the converter as a whole in the case that the snubber units are provided in the embodiment 2.
Figure 13B:
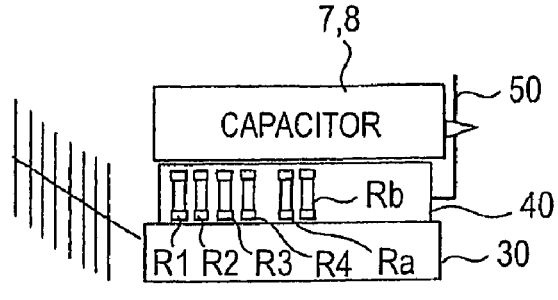
Figure 14A:
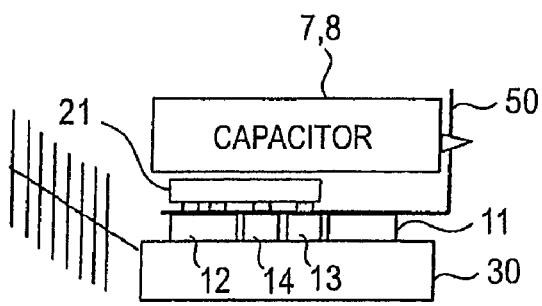
FIG. 14 It is a side view schematically showing still another example of the converter as a whole in the case that the snubber units are provided in the embodiment 2.
Figure 14B:
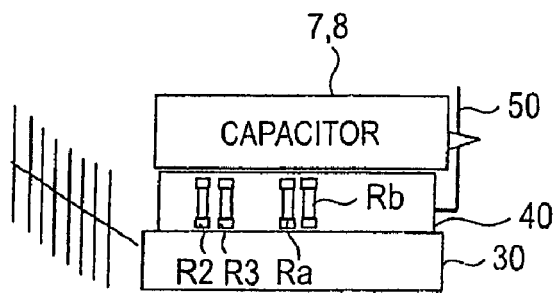

FIGS. 12 to 14 show side views schematically showing a converter as a whole in the case that the snubber units are provided respectively. In this case, FIG. 12 corresponds to FIG. 9, FIG. 13 corresponds to FIG. 10, and FIG. 14 corresponds to FIG. 11, and a cooler base 30 common to the modules 11 to 14, respective bodies of the modules 11 to 14, the snubber units 21 to 24, and the capacitors 7 and 8 are three-dimensionally stacked in this order.

(a) of each figure shows a state where a side face of each of the modules 11 to 14 is covered with an insulating plate 40, and the insulating plate 40 is attached with the voltage dividing resistances Ra and Rb and the discharge resistances R1 to R4. (b) of each figure shows a state where the insulating plate 40 is removed so that a wiring board 50 for interconnecting between the elements may be seen.

When the snubber units 21 to 24 are not used, the insulating plate 40 is not provided, and the voltage dividing resistances Ra and Rb are directly provided on the modules 13 and 14 of the first and second coupling diodes respectively.

Embodiment 3

Figure 15:
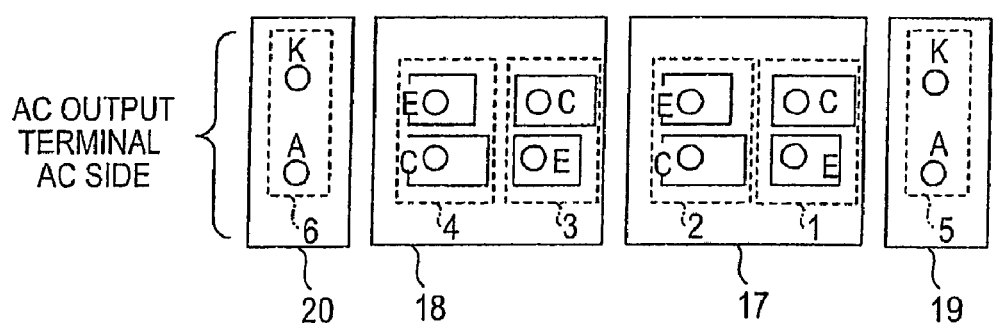
FIG. 15 It is a plan view showing a module arrangement configuration of a 3-level power converter of embodiment 3 of the invention.

In the embodiment 1, the modules are in the module arrangement configuration where the modules 11 and 12 each including IGBT are disposed on both sides, and the module 13 including the second coupling diode, and the module 14 including the first coupling diode are sequentially arranged in a line between the modules 11 and 12. However, as shown in FIG. 15, the modules may be in a module arrangement configuration where a fifth module 17 is configured by a set of the first and second IGBT 1 and 2 being upper elements as a configuration unit, and a sixth module 18 is configured by a set of the third and fourth IGBT 3 and 4 being lower elements as a configuration unit, and a seventh module 19 including the first coupling diode 5 and an eighth module 20 including the second coupling diode 6 are arranged in a manner of interposing the modules 17 and 18, and the eighth module 20, the sixth module 18, the fifth module 17, and the seventh module 19 are arranged in a line in this order from a position near the AC output terminal AC.

Even in such a module arrangement configuration, a converter may be reduced in size, and consequently floating inductance of each wiring may be reduced, in addition, when the 3-level power converter is used for a large-capacity power converter, the snubber units 21 to 24 shown in FIG. 8 may be appropriately used.

Moreover, when a trouble occurs in the upper elements or the lower elements, two modules must be replaced in the case of the module arrangement configuration in the embodiment 1. However, according to the module arrangement configuration according to the embodiment, only one module can be replaced.

While a case that IGBT was used as a switching element was described hereinbefore, the invention may be similarly used even for a different switching element such as a transistor, an intelligent power module, or FET, and exhibits the same advantage even in such a case.

The invention claimed is:

1. A 3-level power converter, having a DC voltage source having a positive terminal, an intermediate terminal, and a negative terminal, first and second switching elements sequentially connected in series between the positive terminal and an AC output terminal, a first coupling diode connected between a connection point between the first and second switching elements and the intermediate terminal, third and fourth switching elements sequentially connected in series between the AC output terminal and the negative terminal, and a second coupling diode connected between a connection point between the third and fourth switching elements and the intermediate terminal, and performing on/off control of the first to fourth switching elements so as to output a 3-level voltage from the AC output terminal, comprising:
a first module including a set of the first and fourth switching elements as a configuration unit;
a second module including a set of the second and third switching elements as a configuration unit;
a third module including the first coupling diode; and
a fourth module including the second coupling diode,
wherein the second module, the fourth module, the third module, and the first module are sequentially arranged in a line from a position near the AC output terminal,
wherein a planar wiring board performing a connection among the switching elements included in the respective modules is disposed on the respective modules arranged in a line, and
wherein divider resistors connected in parallel to the first and second coupling diodes, respectively, are stacked on a side of the wiring board opposite to the modules so as to be sterically arranged.

2. The 3-level power converter according to claim 1, wherein common heat pipes are provided for respective coolers of the second module, the fourth module, the third module, and the first module sequentially arranged in a line, along an arrangement direction of the modules.

3. The 3-level power converter according to claim 1, wherein
the DC voltage source comprises a capacitor,
the 3-level power converter further comprises a cooler common to the first to fourth modules, and
the first to fourth modules arranged in a line, the planar wiring board, the divider resistors, and the capacitor are stacked on the common cooler.

4. A 3-level power converter, having a DC voltage source having a positive terminal, an intermediate terminal, and a negative terminal, first and second switching elements sequentially connected in series between the positive terminal and an AC output terminal, a first coupling diode connected between a connection point between the first and second switching elements and the intermediate terminal, third and fourth switching elements sequentially connected in series between the AC output terminal and the negative terminal, and a second coupling diode connected between a connection point between the third and fourth switching elements and the intermediate terminal, and performing on/off control of the first to fourth switching elements so as to output a 3-level voltage from the AC output terminal, comprising:
a first module including a set of the first and fourth switching elements as a configuration unit;
a second module including a set of the second and third switching elements as a configuration unit;
a third module including the first coupling diode; and
a fourth module including the second coupling diode,
wherein the second module, the fourth module, the third module, and the first module are sequentially arranged in a line from a position near the AC output terminal,
wherein a planar wiring board performing a connection among the switching elements included in the respective modules is disposed on the respective modules arranged in a line, and
wherein snubber units, each including a snubber circuit connected in parallel to each of the switching elements, are stacked on a side of the wiring board opposite to the modules so as to be sterically arranged, and
wherein the divider resistors connected in parallel to the first and second coupling diodes, respectively, are arranged on an insulating plate disposed on side surfaces of the first to fourth modules.

5. The 3-level power converter according to claim 4, wherein
the DC voltage source comprises a capacitor,
the 3-level power converter further comprises a cooler common to the first to fourth modules, and
the first to fourth modules arranged in a line, the planar wiring board, the snubber units, and the capacitor are sequentially stacked on each other.

6. A 3-level power converter, having a DC voltage source having a positive terminal, an intermediate terminal, and a negative terminal, first and second switching elements sequentially connected in series between the positive terminal and an AC output terminal, a first coupling diode connected between a connection point between the first and second switching elements and the intermediate terminal, third and fourth switching elements sequentially connected in series between the AC output terminal and the negative terminal, and a second coupling diode connected between a connection point between the third and fourth switching elements and the intermediate terminal, and performing on/off control of the first to fourth switching elements so as to output a 3-level voltage from the AC output terminal, comprising:
a first module including a set of the first and second switching elements as a configuration unit;
a second module including a set of the third and fourth switching elements as a configuration unit;
a third module including the first coupling diode; and
a fourth module including the second coupling diode,
wherein the fourth module, the second module, the first module, and the third module are sequentially arranged in a line from a position near the AC output terminal,
wherein a planar wiring board performing a connection among the switching elements included in the respective modules is disposed on the respective modules arranged in a line, and
wherein divider resistors connected in parallel to the first and second coupling diodes, respectively, are stacked on a side of the wiring board opposite to the modules so as to be sterically arranged.

7. A 3-level power converter, having a DC voltage source having a positive terminal, an intermediate terminal, and a negative terminal, first and second switching elements sequentially connected in series between the positive terminal and an AC output terminal, a first coupling diode connected between a connection point between the first and second switching elements and the intermediate terminal, third and fourth switching elements sequentially connected in series between the AC output terminal and the negative terminal, and a second coupling diode connected between a connection point between the third and fourth switching elements and the intermediate terminal, and performing on/off control of the first to fourth switching elements so as to output a 3-level voltage from the AC output terminal, comprising:
a first module including a set of the first and second switching elements as a configuration unit;
a second module including a set of the third and fourth switching elements as a configuration unit;
a third module including the first coupling diode; and
a fourth module including the second coupling diode,
wherein the fourth module, the second module, the first module, and the third module are sequentially arranged in a line from a position near the AC output terminal,
wherein a planar wiring board performing a connection among the switching elements included in the respective modules is disposed on the respective modules arranged in a line,
wherein snubber units, each including a snubber circuit connected in parallel to each of the switching elements, are stacked on a side of the wiring board opposite to the modules so as to be sterically arranged, and
wherein the divider resistors connected in parallel to the first and second coupling diodes, respectively, are arranged on an insulating plate disposed on side surfaces of the first to fourth modules.

* * * * *